US005705141A

United States Patent [19]

Dumont et al.

[11] Patent Number: 5,705,141

[45] Date of Patent: *Jan. 6, 1998

[54] CALCIUM AND/OR MAGNESIUM HYDROXIDE, AND PREPARATION AND USE THEREOF

[75] Inventors: Philippe A. Dumont, Auderghem; Robert Goffin, Trooz, both of Belgium

[73] Assignee: Lhoist Researche et Developpement S.A., Belgium

[*] Notice: The term of this patent shall not extend beyond the expiration date of Pat. No. 5,173,279.

[21] Appl. No.: 588,286

[22] Filed: Jan. 18, 1996

Related U.S. Application Data

[63] Continuation of Ser. No. 66,155, filed as PCT/BE91/00082, Nov. 20, 1991, published as WO92/09528, Jun. 11, 1992, abandoned, and a continuation-in-part of Ser. No. 946,936, Sep. 17, 1992, Pat. No. 5,277,837, which is a division of Ser. No. 616,784, Nov. 21, 1990, Pat. No. 5,173,279.

[30] Foreign Application Priority Data

Nov. 21, 1990 [BE] Belgium .................... 09001102

[51] Int. Cl.$^6$ .................... C01B 13/14
[52] U.S. Cl. .................... 423/640; 423/636
[58] Field of Search .................... 423/640, 636; 252/190, 192

[56] References Cited

U.S. PATENT DOCUMENTS

| | | | |
|---|---|---|---|
| 4,636,379 | 1/1987 | Bestek et al. | 423/640 |
| 5,173,279 | 12/1992 | Dumont et al. | 423/240 |
| 5,277,837 | 1/1994 | Dumont et al. | 252/190 |
| 5,492,685 | 2/1996 | Moran et al. | 423/244.07 |

FOREIGN PATENT DOCUMENTS

| | | | |
|---|---|---|---|
| 2031109 | 12/1971 | Germany . | |
| 3620024 | 12/1987 | Germany | C01F 11/02 |
| 59-128212 | 7/1984 | Japan | C01F 11/02 |
| 2-34513 | 2/1990 | Japan | C01F 11/02 |

OTHER PUBLICATIONS

Translation of JP-A-2-34513.

*Primary Examiner*—Michael Lewis
*Assistant Examiner*—Thomas G. Dunn, Jr.
*Attorney, Agent, or Firm*—Charles D. Gunter, Jr.

[57] ABSTRACT

The invention relates to a method for the preparation of a special calcium and/or magnesium hydroxide in which CaO and/or MgO is reacted with water in the presence of an additive selected among ethylene glycol, diethylene glycol, triethylene glycol, monoethanolamine, diethanolamine, triethanolamine and mixtures thereof, the weight ratio additive to CaO and/or MgO being greater than 0.002:1.

10 Claims, No Drawings

CALCIUM AND/OR MAGNESIUM HYDROXIDE, AND PREPARATION AND USE THEREOF

This application is a continuation of Ser. No. 08/066,155 filed May 18, 1993, now abandoned; which is a 371 of PCT/BE91/00082 filed Nov. 20, 1991; and a continuation-in-part of Ser. No. 07/946,936 filed Sep. 17, 1992, now U.S. Pat. No. 5,277,837; which is a divisional of Ser. No. 07/616,784 filed Nov. 21, 1990, now U.S. Pat. No. 5,173,279.

The present invention relates to a special calcium and/or magnesium hydroxide.

The invention relates also to a method for the preparation of a special calcium and/or magnesium hydroxide, in which CaO and/or MgO is reacted with water in presence of an additive selected among ethylene glycol, diethylene glycol, triethylene glycol, monoethanolamine, diethanolamine, triethanolamine and mixtures thereof, the weight ratio additive to CaO and/or MgO being greater than 0.002:1.

A further object of the invention is a composition containing said special calcium and/or magnesium hydroxide, a method for the preparation thereof and uses thereof.

The State of the Art

Calcium hydroxide is prepared in a known manner by slaking quicklime or decarbonated dolomite.

In order to obtain a calcium hydroxide the moisture content of which is below 50%, it is known that, in order to avoid a costly drying stage, the quicklime can be reacted with water, the water-to-lime ratio by weight being less than 2. A calcium hydroxide prepared in this manner has a specific surface area of the order of 15–20 m$^2$/g. Such a calcium hydroxide, in view of its low specific surface area, does not allow correct treatment of gases or smoke from which acid compounds are to be eliminated.

It is well known that the reactivity of a product depends, amongst other things, on its specific surface area.

Experts have therefore tried to increase the specific surface area of calcium hydroxide.

In a first method for increasing the specific surface area of calcium hydroxide, experts reacted quicklime with water in the presence of methanol. The calcium hydroxide obtained by such a method has a specific surface area generally between 17 and 35 m$^2$/g. Moreover this method is costly and dangerous owing to the production of methanol vapour.

In another method (see DE-A-3620024), experts proposed converting quicklime to calcium hydroxide by reaction with water in the presence of an additive for increasing specific area and an additive for increasing fluidity. The additive for increasing specific surface area is selected from among alcohols, sugar, etc., while the additive for increasing fluidity is selected from among glycols, amines and/or other products which promote grinding.

In the only example which document DE-A-3620024 contains, 100 parts by weight of finely divided quicklime were mixed with 70 parts by weight of water, 1 part by weight of propylene glycol and 2 parts by weight of molasses.

Reproduction of this example showed that the calcium hydroxide prepared in this way has a specific surface area below 35 m$^2$/g.

BRIEF DESCRIPTION OF THE INVENTION

The applicant surprisingly discovered that by using particular additives known to be additives for increasing fluidity, it was possible to obtain a calcium hydroxide exhibiting a specific surface area above 35 m$^2$/g, or indeed 40 m$^2$/g or even 50 m$^2$/g.

The present invention therefore relates to a calcium hydroxide the moisture content of which is below 50%, preferably below 15%, this hydroxide having a specific surface area above 35 m$^2$/g, advantageously above 40 m$^2$/g, and preferably between 45 and 80 m$^2$/g.

The present invention also relates to a composition containing a calcium hydroxide having a specific surface area above 35 m$^2$/g, advantageously above 40 m$^2$/g, and preferably above 45 m$^2$/g.

The present invention also relates to a method for the preparation of a calcium and/or magnesium hydroxide according to the invention. According to this method of preparation, CaO and/or MgO is reacted with a quantity of water such that the calcium and/or magnesium hydroxide exhibits a moisture content below 50% and in the presence of a quantity of an additive selected from among ethylene glycol, diethylene glycol, triethylene glycol, monoethanolamine, diethanolamine, triethanolamine and mixtures thereof, the quantity of additive being such that the specific surface area is above 35 m$^2$/g, preferably above 40 m$^2$/g.

According to one characteristic, a quantity of water such that the ratio of water to CaO and/or MgO by weight is between 0.6:1 and 2:1, preferably between 0.7:1 and 1.5:1, is used.

However, advantageously, a quantity of water such that the ratio of water to CaO and/or MgO by weight is between 0.8:1 and 1.2:1, preferably between 0.9:1 and 1.1:1, is used. According to another characteristic of the method according to the invention, a quantity of said additive such that the ratio of additive to CaO and/or MgO by weight is above 0.002:1 is used. This ratio by weight is advantageously above 0.004:1 and below 0.03:1 and is preferably between 0.005:1 and 0.02:1.

The calcium and/or magnesium hydroxide obtained by the method described above may if necessary be subjected to drying to reduce the moisture content, or even to obtain a dried hydroxide.

In view of the high specific surface area of the calcium and/or magnesium hydroxide according to the invention and hence its very high reactivity, the invention further relates to a method for the treatment of gases or smoke in which a calcium and/or magnesium hydroxide according to the invention, in particular a calcium hydroxide prepared by a method according to the invention, is injected into the gases or smoke to be treated so as to eliminate acid compounds, sulphur oxides, hydrochloric acid, etc. therefrom.

In one embodiment of this method of treatment, CaO and/or MgO is reacted with a quantity of water such that the calcium and/or magnesium hydroxide exhibits a moisture content below 50% and in the presence of a quantity of an additive selected from among ethylene glycol, diethylene glycol, triethylene glycol, monoethanolamine, diethanolamine, triethanolamine and mixtures thereof, the quantity of additive being such that the specific surface area is above 35 m$^2$/g, preferably above 40 m$^2$/g, this calcium hydroxide exhibiting a temperature above 70° C., and this hydroxide having a temperature above 70° C. is injected into the gases or smoke to be treated.

Advantageously, a calcium hydroxide having a temperature between 90° and 150° C. is injected into the gases or smoke to be treated.

The applicant noted that the injection of hot and particularly moist calcium hydroxide into the gases or smoke made it possible to obtain better results in the treatment of gases (desulphurisation).

It was also noted that for treatments of desulphurisation of gases or dechlorination thereof, good results could be obtained for a Ca/S or Ca/2HCl ratio above 1.1, advantageously above 1.5 and preferably between 2 and 3.

The present invention further relates to a composition containing a calcium hydroxide according to the invention as well as a quantity of water, such that the composition is in the form of a milk or slurry, that is, its moisture content is above 50%.

In one embodiment, the composition contains at least 0.2%, preferably 0.3% by weight of an additive selected from among ethylene glycol, diethylene glycol, triethylene glycol, monoethanolamine, diethanolamine, triethanolamine and mixtures thereof, referred to the weight of calcium and/or magnesium hydroxide. This percentage is advantageously between 0.35 and 2.5, preferably between 0.35 and 1.5.

Such a composition is advantageously prepared by reacting CaO and/or MgO with water, the ratio of water to CaO and/or MgO being above 2 in the presence of at least 0.2%, or preferably 3% by weight of an additive selected from among ethylene glycol, diethylene glycol, triethylene glycol, monoethanolamine, diethanolamine, triethanolamine and mixtures thereof, referred to the weight of CaO and/or MgO, so as to obtain a mixture containing particles of calcium and/or magnesium hydroxide which after drying at 70° C. in a vacuum have a specific surface area above 35 $m^2/g$.

Advantageously the ratio by weight of additive to CaO and/or MgO is above 0.002 and below 0.03, preferably above 0.003 and below 0.02. In particular this ratio is between 0.005 and 0.015.

Such milks of lime and/or dolomite [mixture $H_2O$—Ca$(OH)_2$ and/or Ca$(OH)_2$—Mg$(OH)_2$] can be used in chemical processes and water treatments; in processes for the stabilization of soils; in processes for the purification of acid gases; in processes for the manufacture of the above calcium carbonate.

The slurries of Ca$(OH)_2$ and/or Ca$(OH)_2$—Mg$(OH)_2$ are, for example, used in the construction industry for the manufacture of mortars, plasters, etc.

The quality of the milks and/or slurries of Ca$(OH)_2$ which may be mixed with Mg$(OH)_2$ and their property, for example their reactivity, depend on the size and structure of the agglomerates or micelles of Ca$(OH)_2$ and/or Ca$(OH)_2$—Mg$(OH)_2$ in suspension. It was noted that the particles of Ca$(OH)_2$ and/or Ca$(OH)_2$—Mg$(OH)_2$ of the agglomerates or micelles must have low granulometry and high porosity in order to obtain a milk or slurry of high reactivity and to reduce or avoid sedimentation of the particles. In the case of slurries, it was noted that a low granulometry and high porosity made it possible to obtain mortars exhibiting high plasticity and a high water retention capacity.

This granulometry and this porosity of the particles are two parameters influencing the specific surface area of the micelles or agglomerates. Hence the reactivity of the milks or slurries can be determined or estimated by measuring specific surface area.

Tests have already been performed to obtain milks or slurries of which the micelles or agglomerates have a significant specific surface area. In these tests, different factors were varied, such as degree of calcination of oxides (CaO, MgO);

fineness of comminution;

slaking temperature;

grinding, and intensity of stirring.

By selecting the optimum parameters, that is oxides obtained by calcination at a low temperature (900° C.) and finely ground;

slaking temperature above 60° C.;

vigorous stirring, and prolonged wet grinding, but using no additive, it was possible to manufacture agglomerates and/or micelles of which the specific surface area was about 25 $m^2/g$ [specific surface area calculated after drying at 70° C. (in a vacuum)].

According to the invention, that is, using an additive selected from among ethylene glycol, diethylene glycol, triethylene glycol, monoethanolamine, diethanolamine, triethanolamine and mixtures thereof, it was possible to manufacture milks or slurries of which the agglomerates and/or micelles has a specific surface area above 35 $m^2/g$, in particular between 40 $m^2/g$ and 80 $m^2/g$.

In the method according to the invention for preparing a composition according to the invention, the CaO and/or MgO—$H_2O$ reaction product is advantageously subjected to wet grinding.

In one particular embodiment of the method, wet grinding is carried out at least during the CaO and/or MgO—$H_2O$ reaction.

It goes without saying that from a composition obtained by the method described above, it is possible after drying to obtain a calcium and/or magnesium hydroxide according to the invention, wherein the moisture content of said hydroxide may be below 50%, advantageously below 25%, preferably below 15%, or even equal to 0%.

Finally, the present invention further relates to a method for the treatment of gases, such as acid gases, in which a composition according to the invention is sprayed or injected into the gases to be treated.

DESCRIPTION OF EXAMPLES OF PREPARATION AND USE

Other characteristics and details of the invention will be apparent from the detailed description below in which reference is made to the following examples of preparation and use.

EXAMPLE 1

In this example, different calcium hydroxides were used in the treatment of smoke.

The smoke treated came from a thermal power station (power 2.5 MW) in which coal having a sulphur content of 1.4% was burnt. This power station included a grate burner (the coal to be burnt being placed on said grate), a heat exchanger for recovering the energy in the burner, cyclone separators for eliminating fly ash from the gases and a column in which calcium hydroxide was injected to eliminate $SO_2$ and HCl from the smoke. This column was situated between the heat exchanger and a filter to recover solid particles such as residual calcium hydroxide, calcium derivatives such as calcium sulphate, dust, etc. The smoke contained 1600–1900 (mean value: 1800 mg $SO_2/m^3$).

For the tests relating to the elimination of HCl from the smoke, the coal used had a very low sulphur content and HCl was injected into the burner so as to obtain smoke containing 1450–1800 mg HCl/$m^3$ (mean value: 1600 mg HCl/$m^3$).

In the tests performed, the total gas output from the power station was between 3200 and 4900 $Nm^3/h$. The temperature of the smoke brought into contact with the calcium hydroxide injected into the column was about 115° C., while the time of contact between the smoke and the injected calcium hydroxide was about 3.7 and 5.6 seconds. The $SO_2$ and HCl content of the smoke was measured before and after contact thereof with the calcium hydroxide.

Supposing that $[HCl]_o$ and $[SO_2]_o$ are the HCl and $SO_2$ contents of the smoke before treatment and $[HCl]_f$ and $[SO_2]_f$ the HCl and $SO_2$ contents of the smoke after treatment, the outputs in % can be calculated as follows:

$$\frac{[HCl]_o - [HCl]_f}{[HCl]_o} \times 100 \text{ for dechlorination}$$

$$\frac{[SO_2]_o - [SO_2]_f}{[SO_2]_o} \times 100 \text{ for desulphurisation}$$

The output of treatment depends on the quantity of calcium hydroxide used in relation to the quantity of $SO_2$ or HCl present in the smoke, that is, the molecular ratio of Ca:S or Ca:2HCl.

In these tests, the following calcium hydroxides were used.

Calcium hydroxide A

Ground quicklime was reacted with a quantity of water corresponding to a water-to-lime ratio of 0.58:1. The calcium hydroxide obtained in this way had a moisture content of 0.8% and a specific surface area of 17 $m^2/g$. The calcium hydroxide as well as the vapour produced during the slaking reaction were injected at a temperature of 90°–100° C. into the smoke.

Calcium hydroxide B

Ground quicklime was reacted with water, the water-to-lime ratio being 0.5, in the presence of diethylene glycol. The ratio of diethylene glycol to lime by weight was 0.001. Thus a calcium hydroxide exhibiting a specific surface area of 25 $m^2/g$ was obtained. This hydroxide, as well as the vapour produced during slaking, were injected at 90°–100° C. into the smoke.

Calcium hydroxide C

Ground quicklime was slaked with 0.83 part by weight of water per part by weight of quicklime in the presence of 0.008 part by weight of diethylene glycol per part by weight of quicklime.

The calcium hydroxide obtained had a moisture content of 12% and a specific surface area of 46 $m^2/g$. The calcium hydroxide and the vapour produced were injected at a temperature of 90°–100° C. into the smoke.

Table I below gives the yields of desulphurization and dechlorination for calcium hydroxides A, B and C as a function of the Ca:S or Ca:HCl ratio.

TABLE I

| Calcium hydroxide | Yield of desulphurisation (%) Ca:S | | | Yield of dechlorination (%) Ca:HCl | | |
|---|---|---|---|---|---|---|
| | 1:1 | 2:1 | 3:1 | 1:2 | 2:2 | 3:2 |
| A | 24 | 33 | 39 | 33 | 46 | 54 |
| B | 37 | 58 | 63 | 41 | 60 | 73 |
| C | 47 | 81 | 88 | 58 | 83 | 96 |

It follows from this table that calcium hydroxide C according to the invention makes it possible to obtain significant yields of desulphurisation and dechlorination even if the Ca:S or Ca:2HCl ratio remains limited.

A high yield allows better use of calcium hydroxide, that is, the use of a smaller quantity of calcium hydroxide to obtain a given result of desulphurisation or dechlorination, that is, the filter for a given result of desulphurisation or dechlorination must recover a smaller quantity of particles.

The better yields obtained by means of the calcium hydroxide according to the invention seem to be due not only to the increase in specific surface area, but also to the increase in porosity of the calcium hydroxide, as well as to an increase in pore diameter. Thus penetration of $SO_2$ into the pores of the calcium hydroxide is increased and hence promotes absorption of $SO_2$.

EXAMPLE 2

A milk of lime was prepared by mixing 50 g of powdered quicklime with a granulometry below 90 microns and high reactivity (obtained by gentle calcination at 900° C. in a revolving kiln) with 600 g of hot water (temperature 80° C.) containing X% by weight of an additive referred to the weight of CaO. The quicklime used had a purity of about 98%.

After a few minutes' reaction, the temperature of the mixture was close to 100° C.

The milk of lime formed in this way was then filtered, and the product recovered in this way was dried at 70° C. and in a vacuum.

In a variant of the method described above, before the operations of filtration and drying the mixture was subjected to wet grinding. To carry out this grinding, there was used a rotary grinder from DYNO-MILL laboratory with a capacity of 1.4 l, the grinding bodies of which were spheres having a diameter between 0.125 and 0.8 mm made of zirconium oxide. The speed of rotation of the grinder was 3400 r.p.m., while the grinding time was below 1 minute.

As a comparative example, a milk or lime was prepared without the use of amine and/or glycol, in the manner described above.

The specific surface area of the micelles of milk of lime was measured by the BET method after drying.

The table below shows the parameters and results (specific surface area) of the milks of lime obtained by the methods described above.

TABLE II

| | Specific surface area $m^2/g$ | |
|---|---|---|
| Additive | no wet grinding | wet grinding |
| 0 | 28.3 | 31.2 |
| 0.5% diethylene glycol | 35.7 | 46.7 |
| 1% diethylene glycol | 39.1 | 63.9 |
| 0.5% triethanolamine | 40.3 | 58.4 |
| 1% triethanolamine | 48.5 | 67.9 |

The diethylene glycol or triethanolamine content of the mixtures expressed in % by weight referred to the weight of $Ca(OH)_2$ can be determined by the formula:

$$X \cdot \frac{56}{74}$$

where X is the % by weight of additives referred to the weight of CaO, and 56 and 74 are respectively the weight of one mole of CaO and of $Ca(OH)_2$.

Thus, when 0.5% by weight of an additive referred to the weight of CaO is used, the mixture contains about 0.35% by weight of said additive referred to the weight of $Ca(OH)_2$, etc.

This table shows that the use of 0.5% and 1% of diethylene glycol and of triethanolamine makes it possible: on the one hand to increase the specific surface area of micelles of the mixture before grinding compared with the specific surface area of micelles of a mixture prepared by simply reacting commercial quicklime with water, and on the other hand to increase the efficiency of wet grinding of the mixture.

Wet grinding of a mixture prepared by simply reacting a commercial quicklime with water only allows an increase of about 10% in specific surface area, whereas wet grinding of a mixture obtained by reacting quicklime in the presence of 0.5 and 1% of diethylene glycol and of triethanolamine with water allows an increase of about 45% in specific surface area.

This example also shows that by drying a composition according to the invention, it is possible to obtain a hydroxide according to the invention.

EXAMPLE 3

Slurries of hydrated dolomite were prepared by mixing 1 part by weight of finely ground decarbonated domolite (granulometry below 90μ) obtained by gentle calcination of dolomite at 900° C. in a revolving kiln and 2.5 parts by weight of water optionally containing an additive. The initial temperature of the mixture was 80° C. (temperature of the water) and a temperature of ±100° C. was reached after a few minutes, so that the decarbonated dolomite was completely hydrated [Ca(OH)$_2$–Mg(OH)$_2$].

After drying the slurry at a temperature of 70° C. and in a vacuum, the specific surface area of particles forming the mixture was measured. The results of the measurements are given in the table below.

TABLE III

| | Specific surface area m$^2$/g |
|---|---|
| no additive | 25 |
| 1% by weight of diethylene glycol referred to the weight of CaO—MgO | 35 |
| 1% by weight of triethanolamine referred to the weight of CaO—MgO | 45 |

EXAMPLE 4

Ground quicklime was slaked with 0.83 part by weight of water in the presence of Y part by weight of diethylene glycol. The hydrate obtained had a moisture content of the order of 10% and a specific surface area given in the table below.

| Y | Surface area (BET) m$^2$/g |
|---|---|
| 0.004 | 37 |
| 0.006 | 38.3 |
| 0.008 | 46 |

The compositions according to the invention such as milks and slurries can be used for the neutralisation of industrial water and smoke, as a binder for masonry and plaster mortars, and for the production of dispersants, lubricants, lime soaps, or surface treatment agents.

In view of the high reactivity of the composition according to the invention, in particular the mixture obtained by the method according to the invention, the present invention also relates to a method for the treatment of acid gases, for example to eliminate compounds such as HCl and SO$_2$ therefrom, in which the gases to be treated are contacted, for example by spraying, with a milk.

The calcium and/or magnesium hydroxide according to the invention, in particular a composition in the form of a milk or slurry according to the invention, can advantageously be used for the preparation of mortars (masonry or plasters). Such mortars have excellent properties of plasticity and may for example consist of sand, water, cement and calcium hydroxide.

English translation of the claims attached to the Preliminary Examination Report

What we claim is:

1. Method for the preparation of calcium hydroxide, said calcium hydroxide having a specific surface area above 40 m$^2$/g and a moisture content below 15%, in which calcium oxide is reacted with water in the presence of organic additive or organic additives, with a weight ratio organic additive or additives/calcium oxide lower than 0.015, said additive being selected from the group consisting of ethylene glycol, diethylene glycol, triethylene glycol, monoethanolamine, diethanolamine, triethanolamine and mixtures thereof, the weight ratio of additive/said calcium oxide being greater than 0.008:1, the moisture content of calcium hydroxide being determined by the appropriate selection of the weight ratio of water to calcium oxide, said ratio being greater than 0.8.

2. The method according to claim 1, in which the weight ratio of additive to said calcium oxide is between 0.005:1 and 0.03:1.

3. The method according to claim 1, in which the weight ratio of additive to said calcium oxide is between 0.005:1 and 0.02:1.

4. Method for the preparation of a calcium-magnesium hydroxide, said hydroxide having a specific surface area above 40 m$^2$/g and a moisture content below 15%, in which calcium-magnesium oxide is reacted with water in the presence of organic additive or organic additives with a weight ratio organic additive or additives/calcium-magnesium oxide lower than 0.015, said additive being selected from the group consisting of ethylene glycol, diethylene glycol, triethylene glycol, monoethanolamine, diethanolamine, triethanolamine and mixtures thereof, the weight ratio of additive/said calcium-magnesium oxide being greater than 0.008:1, the moisture content of the calcium-magnesium hydroxide being determined by the appropriate selection of the weight ratio of water to calcium-magnesium oxide, said ratio being greater than 0.8.

5. Method for the preparation of a calcium-magnesium hydroxide, said hydroxide having a specific surface area above 40 m$^2$/g and a moisture content below 15%, in which calcium-magnesium oxide is reacted with water in the presence of organic additive or organic additives with a weight ratio organic additive or additives/calcium-magnesium oxide lower than 0.015, said additive being selected from the group consisting of ethylene glycol, diethylene glycol, triethylene glycol, monoethanolamine, diethanolamine, triethanolamine and mixtures thereof, the weight ratio of additive/said calcium-magnesium oxide being greater than 0.008:1, the moisture content of the calcium-magnesium hydroxide content being determined by the appropriate selection of the weight ratio of water to calcium-magnesium oxide, said ratio being equal to about 0.8.

6. Method for the preparation of a calcium hydroxide, said hydroxide having a specific surface area above 40 m$^2$/g and a moisture content below 15%, in which calcium oxide is reacted with water in the presence of organic additive or organic additives, with a weight ratio organic additive or additives/calcium oxide lower than 0.015, said additive being selected from the group consisting of ethylene glycol, diethylene glycol, triethylene glycol, monoethanolamine, diethanolamine, triethanolamine and mixtures thereof, the weight ratio of additive/said calcium oxide being greater than 0.008:1, the moisture content of the calciumhydroxide being determined by the appropriate selection of the Weight ratio of water to calcium oxide, said ratio being equal to about 0.8.

7. Method for the preparation of calcium hydroxide, said calcium hydroxide having a specific surface area above 40 $m^2/g$ and a moisture content of 12%, in which calcium oxide is reacted with water in the presence of organic additive or organic additives, with a weight ratio organic additive or additives/calcium oxide lower than 0.015, said additive being selected from the group consisting of ethylene glycol, diethylene glycol, triethylene glycol, monoethanolamine, diethanolamine, triethanolamine and mixtures thereof, the weight ratio of additive/said calcium oxide being greater than 0.008:1, the moisture content of calcium hydroxide being determined by the appropriate selection of the weight ratio of water to calcium oxide, said ratio being greater than 0.8.

8. Method for the preparation of a calcium-magnesium hydroxide, said hydroxide having a specific surface area above 40 $m^2/g$ and a moisture content of 12%, in which calcium-magnesium oxide is reacted with water in the presence of organic additive or organic additives with a weight ratio organic additive or additives/calcium-magnesium oxide lower than 0.015, said additive being selected from the group consisting of ethylene glycol, diethylene glycol, triethylene glycol, monoethanolamine, diethanolamine, triethanolamine and mixtures thereof, the weight ratio of additive/said calcium-magnesium oxide being greater than 0.008:1, the moisture content of the calcium-magnesium hydroxide being determined by the appropriate selection of the weight ratio of water to calcium-magnesium oxide, said ratio being greater than 0.8.

9. Method for the preparation of a calcium-magnesium hydroxide, said hydroxide having a specific surface area above 40 $m^2/g$ and a moisture content of 12%, in which calcium-magnesium oxide is reacted with water in the presence of organic additive or organic additives with a Weight ratio organic additive or additives/calcium-magnesium oxide lower than 0.015, said additive being selected from the group consisting of ethylene glycol, diethylene glycol, triethylene glycol, monoethanolamine, diethanolamine, triethanolamine and mixtures thereof, the weight ratio of additive/said calcium-magnesium oxide being greater than 0.008:1, the moisture of the calcium-magnesium hydroxide content being determined by the appropriate selection of the weight ratio of water to calcium-magnesium oxide, said ratio being equal to about 0.8.

10. Method for the preparation of a calcium hydroxide, said hydroxide having a specific surface area above 40 $m^2/g$ and a moisture content of 12%, in which calcium oxide is reacted with water in the presence of organic additive or organic additives, with a weight ratio organic additive or additives/calcium oxide lower than 0.015, said additive being selected from the group consisting of ethylene glycol, diethylene glycol, triethylene glycol, monoethanolamine, diethanolamine, triethanolamine and mixtures thereof, the weight ratio of additive/said calcium oxide being greater than 0.008:1, the moisture content of calcium hydroxide being determined by the appropriate selection of the weight ratio of water to calcium oxide, said ratio being equal to about 0.8.

* * * * *

UNITED STATES PATENT AND TRADEMARK OFFICE
CERTIFICATE OF CORRECTION

PATENT NO.   : 5,705,141
DATED        : January 6, 1998
INVENTOR(S)  : Philippe A. Dumont et al.

It is certified that error appears in the above-indentified patent and that said Letters Patent is hereby corrected as shown below:

On the title page: Item [73]

Please delete "Lhoist Researche et Developpement S.A." as the assignee and insert --Lhoist Recherche et Developpement S.A.

Signed and Sealed this

Twenty-eighth Day of April, 1998

Attest:

BRUCE LEHMAN

Attesting Officer

Commissioner of Patents and Trademarks